United States Patent [19]
Karuppaswamy et al.

[11] Patent Number: 5,803,532
[45] Date of Patent: Sep. 8, 1998

[54] ENERGY ABSORBING MOLDING ASSEMBLY

[75] Inventors: Senthil Nathan Karuppaswamy, Southfield; Majid Rostami, Northville; James Charles Loman, Brighton, all of Mich.

[73] Assignee: General Motors Corporation, Detroit, Mich.

[21] Appl. No.: 768,377

[22] Filed: Dec. 17, 1996

[51] Int. Cl.⁶ .................................................... B60J 7/00
[52] U.S. Cl. ........................... 296/189; 280/751; 24/296; 411/508
[58] Field of Search ........................ 296/189; 280/751; 24/296, 297; 411/508, 509, 913

[56] References Cited

U.S. PATENT DOCUMENTS

| | | | |
|---|---|---|---|
| 2,590,264 | 3/1952 | Meyers et al. | 24/297 X |
| 2,986,793 | 6/1961 | Bright | 24/296 X |
| 3,779,595 | 12/1973 | Suzuki et al. | 296/28 |
| 3,806,154 | 4/1974 | Akiyama | 280/150 |
| 3,831,707 | 8/1974 | Glance | 180/90 |
| 3,924,707 | 12/1975 | Renner et al. | 180/90 |
| 3,951,427 | 4/1976 | Wilfert | 280/732 |
| 4,123,085 | 10/1978 | Oda et al. | 280/752 |
| 4,229,036 | 10/1980 | Toda | 296/202 |
| 4,591,204 | 5/1986 | Gallitzendoerfer et al. | 296/202 |
| 5,163,730 | 11/1992 | Welch | 296/189 |
| 5,362,102 | 11/1994 | Hajek et al. | 280/751 |
| 5,367,751 | 11/1994 | DeWitt | 24/297 X |
| 5,533,237 | 7/1996 | Higgins | 24/297 X |
| 5,568,675 | 10/1996 | Asami et al. | 24/297 X |
| 5,580,116 | 12/1996 | Patel et al. | 296/189 X |
| 5,580,204 | 12/1996 | Hultman | 24/297 X |

FOREIGN PATENT DOCUMENTS

| | | | |
|---|---|---|---|
| 1450901 | 3/1969 | Germany | 24/297 |
| 1475141 | 7/1969 | Germany | 24/297 |
| 888450 | 1/1962 | United Kingdom | 24/297 |

*Primary Examiner*—Joseph D. Pape
*Attorney, Agent, or Firm*—Charles E. Leahy

[57] ABSTRACT

A molded plastic molding has a plurality of blades extending generally perpendicularly off the back side thereof and spaced along the length of the molding. A plurality of openings are provided in a body panel for receiving the blades of the molding. A fastener clip is installed in each of the openings for retaining the blade upon insertion of the blade into the opening. The fastener clip has opposed facing spring legs which project through the opening and have feet which bear against the panel to retain the clip to the panel. The fastener clip includes a base having an aperture through which the blade is inserted and opposed facing teeth are provided in the aperture to enable one way insertion of the blade clipped to the fastener clip to thereby grip the blade and retain the molding to the clip. Collapsible energy absorbing material such as foam is interposed between the molding and the body panel to enable progressive movement of the molding toward the body panel upon application of an impact force to the molding.

3 Claims, 2 Drawing Sheets

5,803,532

ENERGY ABSORBING MOLDING ASSEMBLY

TECHNICAL FIELD

The invention relates to an energy absorbing molding assembly for covering a vehicle body panel, particularly a windshield pillar.

BACKGROUND OF THE INVENTION

It is well known in automobile vehicle body construction to provide a vertical pillar which supports the roof and defines the intersection of the windshield opening and the door opening. The pillar is of welded sheet metal construction and is conventionally concealed behind a molded plastic molding assembly.

Prior patents such as U.S. Pat. No. 5,163,730, assigned to the assignee of this invention, have proposed the use of an attachment between the molding and the pillar for absorbing energy.

The present invention provides a new and improved energy absorbing molding assembly for covering the vehicle body, such as a windshield pillar. In particular, the energy absorbing molding assembly of this invention includes a molded plastic molding having a plurality of blades extending generally perpendicularly off the back side thereof and are spaced along the length of the molding. A plurality of openings are provided in the body panel for receiving the blades of the molding. A fastener clip is installed in each of the openings for retaining the blade upon insertion of the blade into the opening. The fastener clip has opposed facing spring legs which project through the opening and have feet which bear against the panel to retain the clip to the panel. The fastener clip includes a base having an aperture through which the blade is inserted and opposed facing teeth are provided in the aperture to enable one way insertion of the blade in the fastener clip to thereby grip the blade and retain the molding to the clip. Energy absorbing material such as foam is interposed between the molding and the body panel to enable progressive movement of the molding toward the body panel upon application of an impact force to the molding. This movement is permitted by the progressive one way insertion of the blade into the opening. The spring legs terminate at tip ends which spread apart to receive the blade with the spring legs bearing on opposite sides of the blades to orient and guide the insertion of the blades into the clip.

BRIEF DESCRIPTION OF THE DRAWINGS

These and other objects, features and advantages of the invention become apparent upon consideration of the description of the preferred embodiment and the appended drawings in which.

DESCRIPTION OF THE PREFERRED EMBODIMENT

Figure 1:
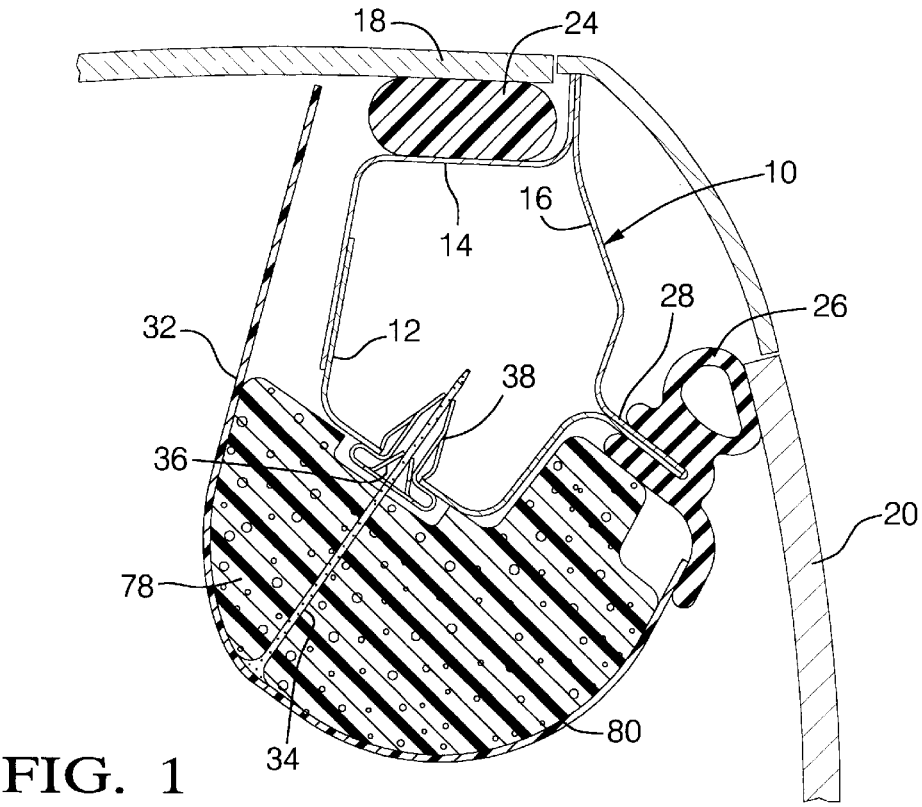
FIG. 1 is a section view through a vehicle pillar having energy absorbing molding construction according to the invention.

Referring to FIG. 1, there is shown a typical section through a vehicle pillar which is comprised of sheet metal stampings 12, 14 and 16 which are welded together and extend generally between the lower part of the vehicle body and the roof to define a windshield opening which is closed by a windshield panel 18 and a door opening which is closed, in part, by a door glass 20. The windshield panel 18 is suitably secured to the panel 14 of pillar 10 by a bead of curable adhesive 24. A weatherstrip 26 is mounted on the pinch flange structure 28 defined at the juncture between panels 12 and 16. The weatherstrip 26 seals against the window glass 20. A decorative plastic molding 32 is provided to conceal the windshield pillar 10 from view from inside the occupant compartment.

FIG. 1 shows a plastic blade 34 which is integrally molded with the molding 32 and projects therefrom through an opening 36 provided in panel 12 of pillar 10. A stamped metal fastener clip 38 is installed within the opening 36 prior to installation of the molding blade 34 and functions to retain the molding 32 on the pillar 10. It will be understood that a plurality of these blades, such as blade 34, are spaced along the length of the molding 32 and each blade registers with a corresponding opening and clip provided on the pillar.

Figure 3:
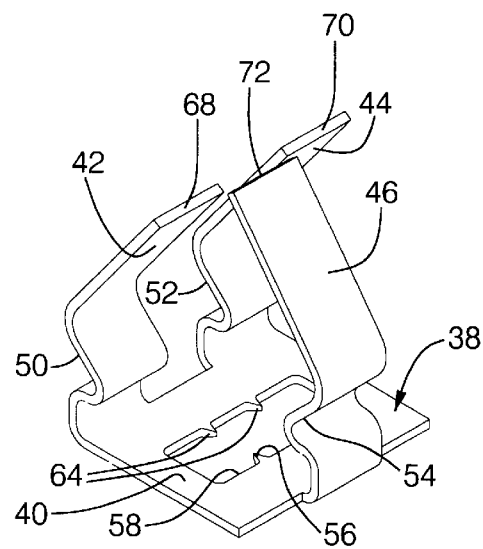
FIG. 3 is a perspective view of the fastener clip used to mount the molding on the pillar.

Referring to FIG. 3, it is seen that a typical fastener clip 38 includes a base wall 40 having spring legs 42 and 44 projecting from one side thereof and spring leg 46 which projects from the other side thereof. As seen in FIG. 3, these spring legs are each bent inwardly to define downwardly facing foot portions, respectively identified at 50, 52 and 54 which, upon insertion of the clip through the opening, will bear upon the backside of the panel 12 to retain the clip within the opening. Furthermore, as seen in FIGS. 1 and 3, the spring fingers 42, 44 and 46 are bent inwardly toward each other so that the spring legs 42 and 44 face toward the spring finger 46 and each of the spring fingers is angled in a way that cause the spring fingers to bear upon the walls of the opening to flex the spring fingers toward one another during insertion.

After installation of the fastener clips 38, the molding 32 is installed by simply pushing the molding 32 against the pillar 10 with blades 34 passing into the clips 38. As best seen in FIG. 3, the base of the clip 40 has an aperture 58 to receive the blade 34 and this aperture has opposed facing barbs 64 and 66 which project from the base 40 into the aperture 58 and grip the blades 34 to retain the blades 34 tightly within the clip. Furthermore, it will be appreciated that the spring fingers 42, 44 and 46 respectively have tip ends 68, 70 and 72 which are forcibly spread apart from one another upon insertion of the blade therebetween so that these tips of the spring fingers will function to orient and guide the blades during the insertion of the blades into the clips.

As seen in FIG. 1A, the space between the molding 32 and the pillar 10 is filled by a block of foam 78 and a block of foam 80 which are positioned on opposite sides of the blades 34.

Figure 2:
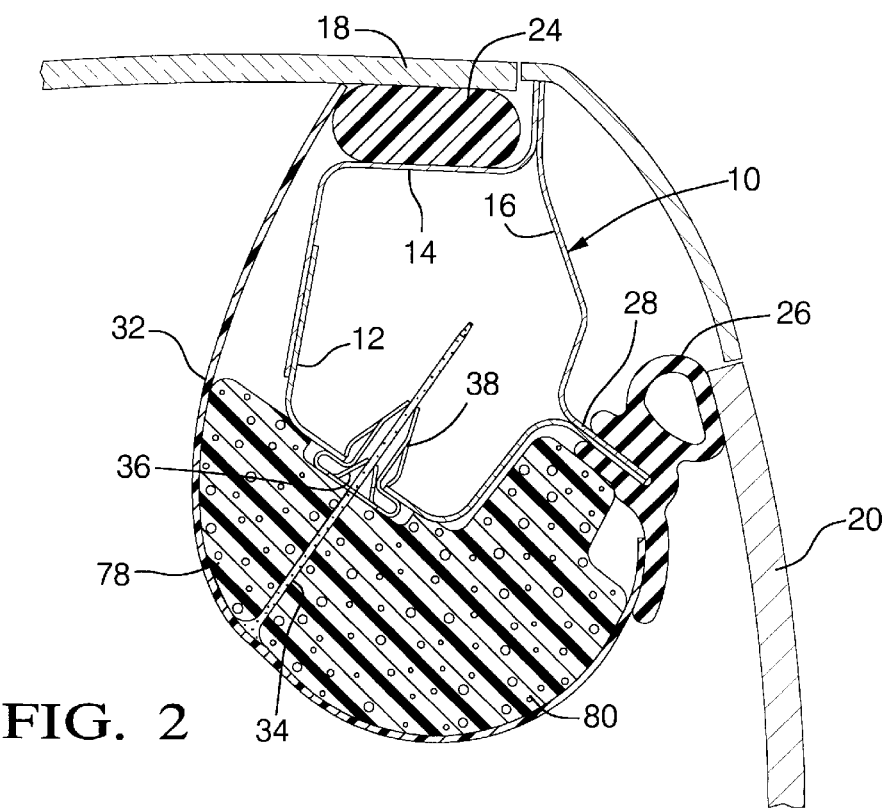
FIG. 2 is a view similar to FIG. 1 but showing the molding having been impacted by a substantial impact force to collapse the energy absorbing foam disposed between the molding and the pillar.

FIG. 2 shows the collapse of the foam blocks 78 and 80 and the bending of the molding 32 which occurs upon the application of an impact force against the molding 32. As seen in FIG. 2, it will be understood that the molding 32 travels toward the pillar 10 during such impact and the blade 34 is pushed further through the opening 36 in the pillar as permitted by the forced passage of the blade 34 through the clip. The blade 34 does not present substantial resistance to the collapse of the molding 32 so that the energy is absorbed within the foam 78 and 80 while the blade passes further into the pillar 10.

Figure 4:
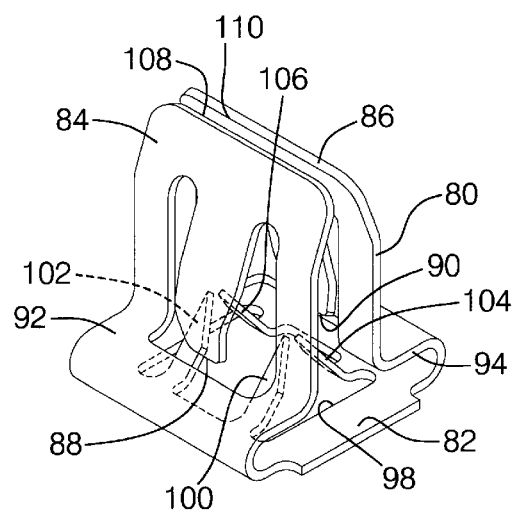
FIG. 4 is a perspective view of an alternative embodiment of the fastener clip.
Figure 5:
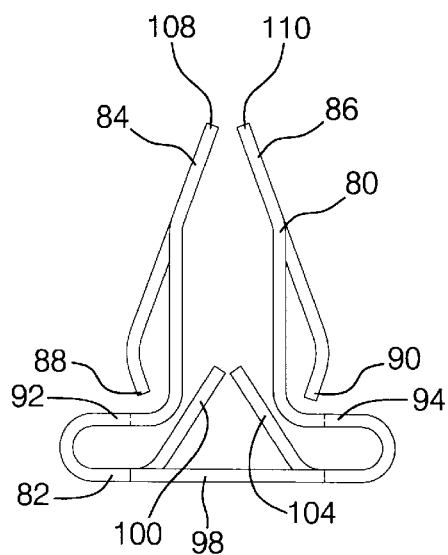
FIG. 5 is a side elevation view of the clip of FIG. 4.
Figure 6:
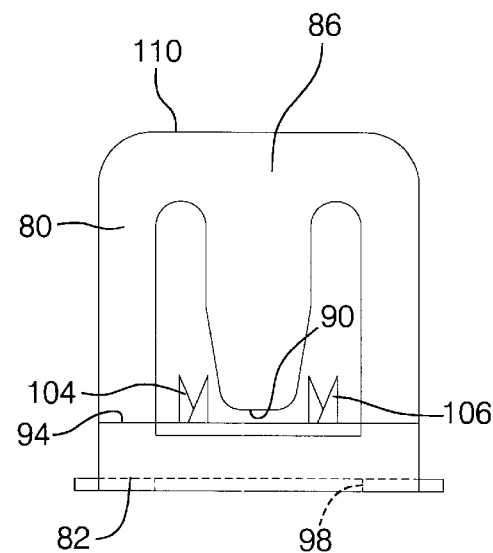
FIG. 6 is a front elevation view of the clip of FIG. 4.

FIGS. 4, 5 and 6 show an alternative embodiment of a fastener clip designated 80. As seen in the drawings, the clip 80 is also of stamped sheet metal construction and includes a base 82 and opposed facing spring fingers 84 and 86 which project from the base and respectively carry feet 88 and 90, which are spaced just above shoulder walls 92 and 94. Accordingly, upon installation of the fastener clip 80, the shoulder walls 92 and 94 will engage against the panel 12 of the pillar to stop the fastener clip's insertion through the opening in the pillar while the feet 88 and 90 will bear against the back side to prevent removal of the clip. Furthermore, as seen in the drawing, the fastener clip 80 includes an aperture 98 in the base wall 82 and opposed facing tangs 100 and 102 on one side of the aperture and 104 and 106 on the other side of the aperture. Accordingly, the blade of the molding may be inserted through the aperture 98 and between the blades which then grip the blade to retain the blade within the clip. Furthermore, it is seen that the spring legs have respective tip ends 108 and 110 which are spaced slightly apart but bear upon the opposed side faces of the blades to orient and guide the blade's insertion through the clip 80.

Thus, it is seen that the invention provides a new and improved energy absorbing molding construction and a pair of fastener clips therefore.

We claim:

1. An energy absorbing molding assembly for covering a vehicle body panel, comprising:

a molded plastic molding having a plurality of blades integrally molded therewith and extending generally perpendicularly off the back side thereof and spaced one from another;

a plurality of openings in the panel registering with the blades of the molding;

a fastener clip installed in each opening for retaining the registering blade upon insertion of the blade;

said fastener clip having opposed facing yieldable spring legs which project through the opening and have feet which bear against the panel to retain the clip to the panel, an aperture to receive the blade, said spring legs having opposed facing tip ends bearing on the blade to guide the blade upon insertion into the clip, and opposed facing tangs to enable one-way insertion of the blade into the fastener clip and to grip the blade and retain the molding to the clip;

and collapsible energy absorbing material interposed between the molding and the body panel to enable progressive movement of the molding toward the body panel as permitted by the progressive insertion of the blade into the opening and through the fastener clip.

2. The energy absorbing molding construction of claim 1 further comprising the fastener clip being of one piece bent steel construction.

3. The energy absorbing molding of claim 2 in which the fastener clip includes a shoulder wall which seats against the body panel to limit insertion of the fastener clip and a base wall which is spaced somewhat from the shoulder wall.

* * * * *